US009500282B2

(12) United States Patent
He et al.

(10) Patent No.: US 9,500,282 B2
(45) Date of Patent: Nov. 22, 2016

(54) CYLINDER LINER AND PREPARATION METHOD THEREOF

(71) Applicant: Guangdong Zhaoqing Power Accessories Co., Ltd., Zhaoqing (CN)

(72) Inventors: Shao He, Zhaoqing (CN); Haoyan Guo, Zhaoqing (CN); Weiming Li, Zhaoqing (CN); Yu Chen, Zhaoqing (CN)

(73) Assignee: Guangdong Zhaoqing Power Accessories Co., Ltd., Zhaoqing (CN)

( * ) Notice: Subject to any disclaimer, the term of this patent is extended or adjusted under 35 U.S.C. 154(b) by 322 days.

(21) Appl. No.: 14/381,452

(22) PCT Filed: Feb. 6, 2013

(86) PCT No.: PCT/CN2013/071452
§ 371 (c)(1),
(2) Date: Aug. 27, 2014

(87) PCT Pub. No.: WO2014/082390
PCT Pub. Date: Jun. 5, 2014

(65) Prior Publication Data
US 2015/0122118 A1 May 7, 2015

(30) Foreign Application Priority Data
Nov. 29, 2012 (CN) .......................... 2012 1 0498912

(51) Int. Cl.
*F02F 1/00* (2006.01)
*F16J 10/04* (2006.01)
(Continued)

(52) U.S. Cl.
CPC ................ *F16J 10/04* (2013.01); *B22D 13/02* (2013.01); *B22D 19/0009* (2013.01);
(Continued)

(58) Field of Classification Search
CPC ....................... F16J 10/04; F02F 1/004; C04B 2235/02; C04B 2235/602
(Continued)

(56) References Cited

U.S. PATENT DOCUMENTS

| 1,955,292 A | * | 4/1934 | Heintz | ...................... | F02F 1/08 123/41.69 |
| 2,085,976 A | * | 7/1937 | Heintz | ...................... | F02F 1/08 123/193.2 |

(Continued)

FOREIGN PATENT DOCUMENTS

| CN | 1652888 A | 8/2005 |
| CN | 101218048 A | 7/2008 |

(Continued)

*Primary Examiner* — Thomas E Lazo
(74) *Attorney, Agent, or Firm* — Weisun Rao; Greenberg Traurig, LLP (57) ABSTRACT

A cylinder liner with a plurality of protrusions on its outside surface and the manufacturing method thereof are disclosed. The protrusions are Ω-shaped, P-shaped or taper-shaped, and the Ω-shaped, P-shaped and taper-shaped protrusions are accounted for 50-99.5%, 0.5-30% and 0-20% of the total number of protrusions, respectively. The density of the protrusions on the outside surface of the cylinder liner is 15-65 per square centimeter. The outer surface of the protrusions of the cylinder liner is curved, and has a large contact area and a concave which can be filled by an aluminum sheath to improve the radial bearing capacity, so as to effectively improve the bite force between the cylinder liner and the outside aluminum sheath and prevent the cylinder liner from breaking away from the cylinder body.

16 Claims, 4 Drawing Sheets (51) Int. Cl.
  *C23C 4/04* (2006.01)
  *B22D 13/02* (2006.01)
  *B22D 19/00* (2006.01)
  *C04B 35/622* (2006.01)

(52) U.S. Cl.
  CPC .............. *C04B 35/622* (2013.01); *C23C 4/04* (2013.01); *F02F 1/004* (2013.01); *C04B 2235/02* (2013.01); *C04B 2235/602* (2013.01)

(58) Field of Classification Search
  USPC ...................................... 92/169.4; 29/888.04
  See application file for complete search history.

(56) References Cited

U.S. PATENT DOCUMENTS

| | | | | |
|---|---|---|---|---|
| 5,749,331 A | * | 5/1998 | Pettersson | C22C 33/0207 123/193.2 |
| 6,123,052 A | * | 9/2000 | Jahn | B22D 19/0081 123/193.2 |
| 7,533,647 B2 | * | 5/2009 | Miyamoto | B22D 19/0009 123/193.2 |
| 7,882,818 B2 | * | 2/2011 | Takami | B22D 19/0009 123/193.2 |
| 8,037,860 B2 | * | 10/2011 | Takami | B22D 19/0009 123/193.1 |
| 8,505,438 B2 | * | 8/2013 | Choi | B22D 13/023 29/888.06 |
| 2005/0161187 A1 | | 7/2005 | Kodama et al. | |
| 2007/0009669 A1 | | 1/2007 | Miyamoto et al. | |
| 2007/0012177 A1 | | 1/2007 | Miyamoto et al. | |
| 2007/0209627 A1 | | 9/2007 | Bing et al. | |
| 2010/0162886 A1 | | 7/2010 | Choi et al. | |
| 2012/0304852 A1 | | 12/2012 | Yamagata et al. | |

FOREIGN PATENT DOCUMENTS

| | | |
|---|---|---|
| CN | 101218428 A | 7/2008 |
| CN | 101769211 A | 7/2010 |
| CN | 202884001 U | 4/2013 |
| EP | 837235 A1 | 4/1998 |
| JP | S53146928 A | 12/1978 |
| JP | S575532 A | 1/1982 |
| JP | 2-290664 A | 11/1990 |
| WO | 2005/078265 A1 | 8/2005 |
| WO | 2011/114888 A1 | 9/2011 |

* cited by examiner

CYLINDER LINER AND PREPARATION METHOD THEREOF

FIELD OF THE INVENTION

The present invention relates generally to the field of automobile engine technology, and more particularly to a cylinder liner and a method for manufacturing the cylinder liner.

BACKGROUND OF THE INVENTION

A cylinder body used in an automobile engine is generally composed of a cylinder liner and an outside aluminum sheath of the cylinder liner, and it produces power by a piston sliding up and down, which is driven by the exploding of the fuel in the combustor in the cylinder liner. Therefore, the inside surface of the cylinder liner need wear resistance of some, and the outside surface of the cylinder liner need powerful bite force, so as to fit together with the outside aluminum sheath firmly, to avoid the aluminum sheath break away.

Enough contact bite force must be provided between the material of the cylinder body and the surface of the cylinder liner, in order to have a good thermal conductivity, so as to have a good engine cooling performance, and reduce the deformation of holes in the cylinder liner at same time. Therefore, it is expected to have a cylinder liner with improved bite force and joint strength. However, there are following defects in the existing cylinder liner:

(1) Bosses and pits are random distributed on the outside surface of the cylinder liner, wherein the bosses is irregular-shaped, such as taper, convex or round and so on. In the manufacture of this cylinder liner, due to the irregular-shape of the bosses, the molten material used for manufacturing the cylinder liner is difficult to fill to each boss desirably, so it is difficult to form ideal protrusions that decrease the bite force between the cylinder liner material and the outside aluminum sheath.

(2) There is another cylinder liner with an aluminum silicon powder layer thermal sprayed on the outside surface of the cylinder body. The thermal spraying layer can effectively reduce the defect of pore between the cylinder liner and the cylinder body, to improve the joint strength between the cylinder liner and the cylinder body, but the process is difficult to control and the cost is high.

SUMMARY OF THE INVENTION

Based on the above, it is an object of the present invention to provide a cylinder liner with strong bite force.

According to an aspect of the invention, a cylinder liner includes a plurality of protrusions on its outside surface, wherein the protrusions are Ω-shaped, P-shaped or taper-shaped; the Ω-shaped, P-shaped and taper-shaped protrusions are accounted for 50-99.5%, 0.5-30% and 0-20% (preferably, 80-99.5%, 0.5-10% and 0-10%) of the total number of protrusions, respectively; wherein the density of the protrusions on the outside surface of the cylinder liner is 15-65 per square centimeter (preferably, 35-45 per square centimeter).

In some embodiments, the height of the protrusion can be 0.3-1.1 mm (preferably, 0.7±0.2 mm); the maximum diameter of the protrusion can be 0.3-2.5 mm.

In some embodiments, the ratio of the cross-sectional area of the protrusion surrounded by a contour line at a height of 0.2 mm of the protrusion to the outside surface area of the cylinder liner is 15-50% (preferably, 20-35%).

In some embodiments, the ratio of the cross-sectional area of the protrusion surrounded by a contour line at a height of 0.4 mm of the protrusion to the outside surface area of the cylinder liner is 5-35% (preferably, 6-16%).

In some embodiments, the cross-sectional area of each protrusion at a height of 0.4 mm of the protrusion is 0.07-5.0 mm$^2$ (preferably, 0.2-5.0 mm$^2$).

It is another object of the present invention is to provide a method for manufacturing the cylinder liner.

According to another aspect of the invention, a method for manufacturing a cylinder liner includes the following steps:

(1) preparing ceramic paste with the following raw materials of respective weight percentages: 4-8% of adhesive, 15-25% of diatomite, 0.001-0.1% of surfactant and 70-80% of soft water, wherein the ceramic paste is obtained by firstly mixing the adhesive, the diatomite and the soft water uniformly and then adding the surfactant;

(2) with controlling the temperature at 220-320° C. and the rotating speed of 700±50 r/min, spraying a layer of the ceramic paste with a thickness of 1.0±0.1 mm onto the inner surface of a steel mould used for manufacturing the cylinder liner, wherein the ceramic paste is immediately subject to a microburst and then forms a ceramic protective layer having a Ω-shaped cavity; and (3) after the formation of the ceramic protective layer of step (2), pouring molten iron into the steel mould, and producing the cylinder liner by filling the Ω-shaped cavity with the molten iron under a centrifugal force.

In some embodiments, the ceramic paste is made from the following raw materials with the respective weight percentages: 4-8% of the adhesive, 15-25% of the diatomite, 0.005-0.01% of the surfactant and 70-80% of the soft water.

In some embodiments, the control parameters of the soft water include an electrical conductivity of equal to or less than 10 μs/cm and a pH value of 7-8.

In some embodiments, the average particle size of the diatomite is 0.05-0.15 mm.

The advantages of the invention are described as follows.

The Ω-shaped Protrusions are provided on the outer circumference surface of the cylinder liner of the present invention, wherein the surface of the Ω-shape protrusions of the cylinder liner is curved, and has a large contact area and a concave which can be filled by an aluminum sheath to improve the radial bearing capacity, so as to effectively improve the bite force between the cylinder liner and the outside aluminum sheath and prevent the cylinder liner from breaking away from the cylinder body. The thermal conductivity of aluminum alloy is 107λ/W·(m·k)$^{-1}$, and the thermal conductivity of gray iron is 39.2λ/W·(m·k)$^{-1}$. Because the contacting area of the Ω-shaped protrusion is larger than the contacting area when aluminum: iron=1:1, it provides the best thermal conductivity which is equal to or greater than 39.2λ/W·(m·k)$^{-1}$.

The present invention makes use of the microburst of the surfactant component in the ceramic paste at a given temperature to form Ω-shaped cavities. In order to make the amount of Ω-shaped protrusions achieve more than 50%, the ceramic paste of the present invention is prepared by soft water, which can avoid calcium, magnesium and other materials in water influencing the effect of the microburst of the surfactant, and can make the formation of the cavity by microburst be under control.

DESCRIPTION OF THE DRAWING REFERENCE SIGNS 1. cylinder liner; 2. protrusion; 3. Ω-shaped protrusion; 4. P-shaped protrusion; 5. taper-shaped protrusion; 6. steel mould; 7. ceramic protective layer; 8. bubble.

DETAILED DESCRIPTION OF THE PREFERRED EMBODIMENTS

According to one embodiment, a cylinder liner includes a plurality of protrusions on its outside surface, wherein the protrusions are Ω-shaped, P-shaped or taper-shaped, and the Ω-shaped, P-shaped and taper-shaped protrusions are accounted for 50-99.5%, 0.5-30% and 0-20% (preferably, 80-99.5%, 0.5-10% and 0-10%) of the total number of protrusions, respectively; wherein the density of the protrusions on the outside surface of the cylinder liner is 15-65 per square centimeter (preferably, 35-45 per square centimeter).

A plurality of protrusions are densely distributed on the outside surface of the cylinder liner, wherein 50%-99.5% of the protrusions are Ω-shaped (the higher the percentage of Ω-shaped protrusions is, the better the performance of bite force and thermal conductivity can be obtained), and 0.5%-30% of the protrusions are P-shaped. The Ω-shaped and P-shaped protrusions have inward contracting portions, i.e. have concave portions for embedding by aluminum sheaths to improve the bearing capacity of the protrusions. The thinnest portions concaved inward of Ω-shaped and P-shaped protrusions are located at a height around 0.4 mm of the protrusions. Therefore, it can effectively improve the bite force between the cylinder liner and the aluminum alloy cylinder block in aluminum alloy cylinder block.

The structure of protrusions of the cylinder liner has the following features:

(1) The height of the protrusions is 0.3-1.1 mm.

The height of the protrusions, which is relative to the outside surface of the cylinder liner, is the distance from the outside surface to the farthest end of the protrusion.

If the height of protrusions in a cylinder liner is less than 0.3 mm, the bite force between the cylinder liner and the outside aluminum alloy sheath will be reduced, due to the reduction of the formation of the protrusions leading to short of protrusions.

If the height of protrusions is more than 1.1 mm, the accuracy of the outside diameter will be reduced due to the non-uniform height of the protrusions, and the protrusions with contractive portions will tend to break up, resulting in the cylinder liner breaking away from the cylinder body.

(2) The maximum outside diameter of the protrusions is 0.3-2.5 mm.

(3) The density of the protrusions distributed on the outside surface of the cylinder liner is 15-65 per square centimeter.

If the density of the protrusions distributed on the outside surface of the cylinder liner is less than 15 per square centimeter ($cm^2$), the bite force between the cylinder liner and the outside aluminum alloy sheath will be reduced due to short of protrusions.

If the density of the protrusions distributed on the outside surface of the cylinder liner is more than 65 per square centimeter ($cm^2$), the protrusions may be adjoined together due to the narrow space between the protrusions, and the protrusions canning not be fully coated with the molten metal produced for the outside aluminum alloy sheath, resulted in clearance between the outside aluminum alloy sheath and the cylinder liner, which will reduces the bite force between the cylinder liner and the outside aluminum alloy sheath.

(4) The ratio S2 of the cross-sectional area of the protrusion surrounded by a contour line at a height of 0.2 mm to the outside surface area of the cylinder liner is 15-50%.

The contour line can be obtained by measuring outer circumference along the height direction of the protrusion using a 3D laser measuring device.

The contour plot can be obtained by measuring along the height direction of the protrusion using 3D laser measuring device or calculated by using the formula of $[(d^2 \times 3.14/4) \times$ Particle Number$]/(10 \times 10) \times 100\%$ after measuring the diameters at a height of 0.2 mm of 5 protrusions in the range of 10 mm×10 mm by a laser projector and calculating the mean of the diameters d.

(5) The ratio S1 of the cross-sectional area of the protrusion surrounded by a contour line at a height of 0.4 mm to the outside surface area of the cylinder liner is 5-35%.

The contour plot can be obtained by measuring along the height direction of the protrusion using 3D laser measuring device or calculated by using the formula of $[(d^2 \times 3.14/4) \times$ Protrusion Number$]/(10 \times 10) \times 100\%$ after measuring the diameter at a height of 0.4 mm of 5 protrusions in the range of 10 mm×10 mm by a laser projector and calculating the mean of the diameters d.

The contour line at a height of 0.4 mm or 0.2 mm means the contour line is at a distance of 0.4 mm or 0.2 mm from the outside surface of the cylinder liner along the direction perpendicularly to the outside surface of the cylinder liner.

(6) The cross section area of the protrusion at a height of 0.4 mm of the protrusion is 0.07-5.0 $mm^2$.

If the cross section area of each protrusion at a height of 0.4 mm of the protrusion is less than 0.07 $mm^2$, the strength of the protrusion will be reduced, and will be damaged easily in production.

If the cross-sectional area of each protrusion at a height of 0.4 mm of the protrusion is more than 5.0 $mm^2$, the molten metal will not fill the space between the protrusions fully, that results in clearance between the cylinder body material and the cylinder liner, which will reduces the bite force between the cylinder liner and the aluminum alloy cylinder body.

The area ratio S1 and the area ratio S2 meet the inequality: S1<S2.

The area surrounded by a contour line located at a height of 0.4 mm means the sum of the cross-sectional areas of all the protrusions at a height of 0.4 mm. The area surrounded by a contour line located at a height of 0.2 mm means the sum of the cross-sectional areas of all the protrusions at a height of 0.2 mm Compared with the condition that the area ratio S1 is more than 5%, the bite force between the cylinder liner and the aluminum alloy cylinder body in the condition that the area ratio S1 is less than 5%, significantly reduces.

Compared with the condition that the area ratio S2 is less than or equal to 50%, the bite force between the cylinder liner and the aluminum alloy cylinder body in the condition that the area ratio S2 is more than 50%, significantly reduces.

A method for manufacturing the above cylinder liner includes the following steps:

(1) preparing ceramic paste with the following raw materials of respective weight percentages: 4-8% of adhesive, 15-25% of diatomite, 0.001-0.1% of surfactant and 70-80% of soft water (preferably, 4-8% of adhesive, 15-25% of diatomite, 0.005-0.01% of surfactant and 70-80% of soft water), wherein the surfactant is added after uniformly mixing the adhesive, the diatomite and the soft water;

(2) with controlling the temperature at 220-320° C. (preferably, 230-260° C.) and the rotating speed of 700±50 r/min (different cylinder liners with different outside diameters need different rotating speeds), spraying a layer of the ceramic paste with a thickness of 1.0±0.1 mm onto the inner surface of a steel mould used for manufacturing the cylinder liner, wherein the ceramic paste is immediately subject to a microburst and then forms a ceramic protective layer having a Ω-shaped cavity; and (3) after the formation of the ceramic protective layer of step (2), pouring molten iron into the steel mould, and producing the cylinder liner by filling the Ω-shaped cavity with the molten iron under a centrifugal force.

The control parameters of the soft water include an electrical conductivity of equal to or less than 10 μs/cm and a pH value of 7-8.

The average particle size of the diatomite is 0.05-0.15 mm.

The diatomite is a basic material of the molding material.

Combining the adhesive with the basic material can make mold wash work better.

Soft water has great effect on ceramic paste. Water without softening contains inorganic salt materials, which can not be seen with the naked eye in the water at normal temperature. Once the inorganic salt materials are heated to their each boiling point, there will be calcium or magnesium separation in the form of carbonate.

A lot of experiments have been made, and the additive amount of each material in the ceramic paste has been obtained.

(1) The additive amount of the diatomite

If the weight percent of the additive amount of the diatomite is less than 15%, the effects of stripping and heat insulation will be reduced.

If the weight percent of the additive amount of the diatomite is more than 25%, the flowability of the ceramic paste will be reduced. Because the ceramic paste can not uniform flow in the inner circumference of the mould, the heights of the protrusions of the cylinder liner are nonuniform, and the accuracy of the outside diameter of the cylinder liner will be reduced.

(2) The additive amount of the adhesive (preferably, bentonite)

If the weight percent of the additive amount of adhesive is less than 4%, the strength of the ceramic paste will be insufficient, which reduces the formation of the protrusions.

If the weight percent of the additive amount of the adhesive is more than 8%, the flowability of the ceramic paste will be reduced. Because the ceramic paste can not uniformly flow in the inner circumference of the mould, the heights of the protrusions of the cylinder liner are nonuniform, and the accuracy of the outside diameter of the cylinder liner will be reduced.

(3) The additive amount of the soft water

If the weight percent of the additive amount of the soft water is less than 70%, the flowability of the ceramic paste will be reduced. Because the ceramic paste can not uniform flow in the inner circumference of the mould, the heights of the protrusions of the cylinder liner are nonuniform, and the accuracy of the outside diameter of the cylinder liner will be reduced.

If the weight percent of the additive amount of the soft water is more than 80%, the ceramic paste will be difficult to dry, which reduces the formation of the protrusions.

(4) The additive amount of the surfactant

If the weight percent of the additive amount of the surfactant is not more than 0.001%, the protrusions will be difficult to be formed on the outer circumference of the mould by the surfactant.

If the weight percent of the additive amount of the surfactant is more than 0.1%, the protrusions with contractive portions will be difficult to be formed on the outer circumference of the mould by the surfactant.

The principle of the microburst of the ceramic paste:

Experimental results demonstrate that the existing of the ceramic paste components in water reduce the surface tension of the water, so that the water can permeate between the particles of the silica powder. And, because of the high speed revolution of the mould and the specific weight of the components in the ceramic paste is greater than that of water, the water will tend to the surface of the ceramic paste under the impact of the centrifugal force. The reduction of the surface tension of water makes micro-explosion easier. When the characteristic occurred in the mould, the ceramic paste will be distributed in the mould uniformly, in order to form a ceramic protective layer distributed uniformly in the internal surface of the mould. Finally, under the effect of the surfactant, localized microburst occurs in the ceramic paste instantaneously to form surface-intensive, Ω-shaped cavities curved inward, so as to form a ceramic protective layer of special structure.

The temperature of the mould production is generally controlled at 220° C. to 320° C. Water will evaporate rapidly in the temperature, which is higher than the boiling point of water. At this time, spray a layer of ceramic paste onto the inside of the mould. Then inject a molten metal into the mould after the protective covering has been formed from the ceramic paste. Finally, the molten metal solidifies to form products. As a result, the productivity of the mould with protective covering can be greatly improved. Furthermore, the operation life of the mould increases, because the protective covering protects the mould from damage by the intense heat of the molten metal.

The protective layer formed by the ceramic paste has the following characteristics:

Ceramic paste is a hydrous mixture consisting of a powdered refractory material and a adhesive, wherein the refractory material is silica powder and the adhesive is bentonite, both of which are ideal ingredients and are easy to be obtained, so the ceramic paste is particularly popular. Furthermore, the formation of the ceramic paste is not confined to the above specific materials, such as adding a wetting agent to the mixture, which reduces the surface tension of water in the mixture. The reduction of the surface tension of water will make mixture more uniform, so the binding function of the adhesive can be fully played, and finally the strength of the protective covering can be better guaranteed. After checking, the structure of the protective covering dried is sponge-like, which proves that it has better heat-shielding performance.

Materials used in the embodiments of the present invention are as follows:

diatomite bought from Imerys Filtration Minerals Inc., with average particle size being 0.05-0.15 mm;

adhesive, which is bentonite, bought from Aidele Ltd., Co.;

surfactant bought from TOHO Chemical Industry Co., Ltd.; and soft water is softened from water by existing technologies, including the following steps: water→water pump→sand filter→carbon filter→water softener→salt box→filter→high pressure pump→reverse osmosis host→pure water tank→detecting the control parameters.

The control parameters of the soft water include an electrical conductivity of equal to or less than 10 μs/cm and a pH value of 7-8.

The invention may be best understood by reference to the following description taken in conjunction with the accompanying drawings.

Embodiment 1

In the present embodiment, the method for manufacturing the cylinder liner comprises the following steps:

(1) preparing ceramic paste with the following raw materials of respective weight percentages: 6% of adhesive (bentonite), 19% of diatomite, 0.08% of surfactant and 74.92% of soft water, wherein the ceramic paste is obtained by firstly mixing the adhesive, the diatomite and the soft water uniformly and then adding the surfactant;

(2) with controlling the temperature at 230° C. and the rotating speed of 700±50 r/min, spraying a layer of the ceramic paste with a thickness of 1.0±0.1 mm onto the inner surface of a steel mould used for manufacturing the cylinder liner, wherein the ceramic paste is immediately subject to a microburst and then forms a ceramic protective layer having a Ω-shaped cavity;

It is necessary to carefully check whether there is exceptional condition such as defect, crack, or damage in the inner cavity of the mould before pouring. Meanwhile it is necessary to ensure that, during the installation, the beating distances of the excircles at the two ends and the inner circumference of the cavity are less than 0.3 mm.

After determining there is no damage in the mould, the mould will be even heated by a flame gun, and the temperature of the excircle mould will be controlled at 230° C.

When spraying, in order to control the rotate speed of the mould at 700±50 r/min, it is necessary to detect and show that the pressure of the spraying is 3.9-4.1 kg and the speed of the spraying is 180 mm-280 mm/s.

Figure 4:
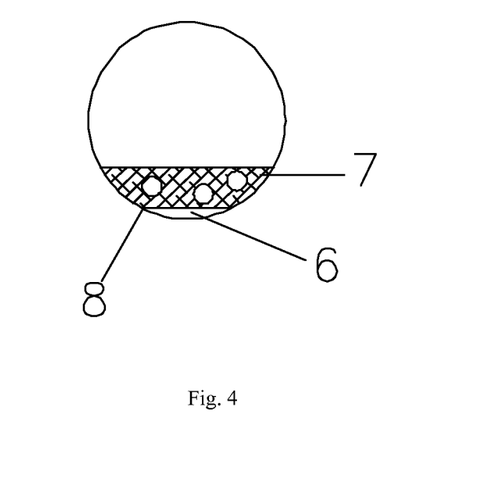
FIG. 4 shows a state diagram of a bubble formation formed by the microburst of surfactant in a ceramic paste.
Figure 5:
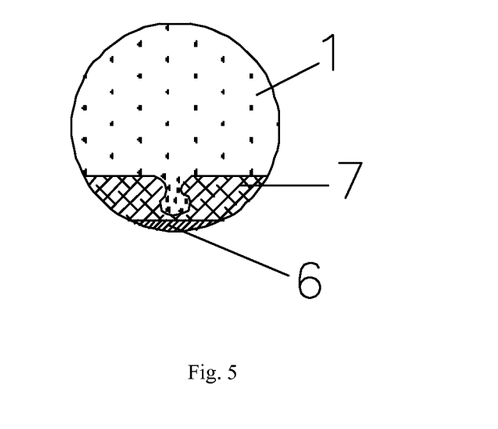
FIG. 5 shows a state diagram of a Ω-shape cavity formation formed by the microburst of the ceramic paste following with the bubble formation of FIG. 4

Due to the surface tension of water reduced by the surfactant in the ceramic paste, the water in the ceramic paste can micro explode instantaneously in a given temperature, and tense Ω-shaped cavities with directivity will be formed on the surface under the impact of the centrifugal force, which will form a cavitary ceramic protective layer after drying for 60±15 s. At high temperatures, bubbles are formed from the ceramic paste first, and the Ω-shaped cavities are formed by the microburst of the bubbles (shown in FIGS. 4 and 5).

(3) After the ceramic protective layer of the step (2) has been formed, pouring molten iron into the steel mould, and the cylinder liner being produced by filling the Ω-shaped cavity with molten iron under the impact of the centrifugal force.

Figure 6:
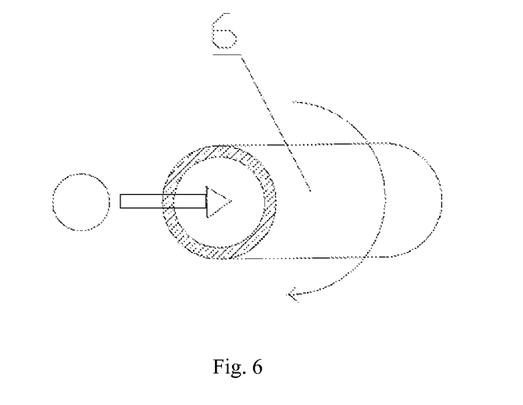
FIG. 6 shows a ceramic paste sprayed into a steel mould.
Figure 7:
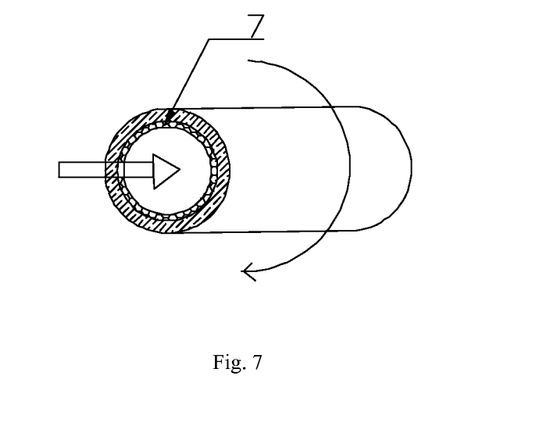
FIG. 7 shows a ceramic protective layer formed in a steel mould from a ceramic paste.
Figure 8:
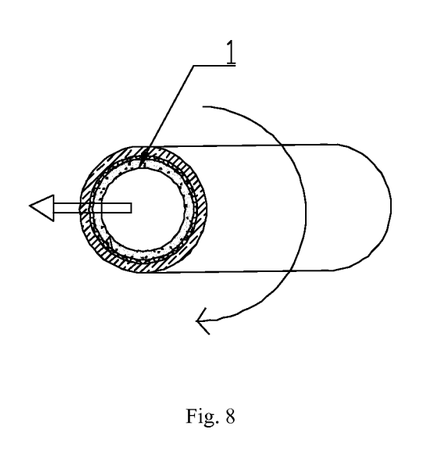
FIG. 8 shows a cylinder liner formed in a steel mould after pouring.

Pouring is started after the uniform protective covering has been formed (see FIGS. 6 to 8). At this time, molten iron at 1300-1500° C. can be poured into the mould. The process of pouring is controlled in 3-5 s, and the rotate speed of the mould is set at 1300-1500 r/min. After pouring, the rotate speed of the mould will be set at 1300-1500 r/min. Then the product is taken out after condensating for 40-60 s. Finally, the cylinder liner will be abrasive blast cleaned to remove the residual paint and burrs on the surface of the cylinder liner.

The control parameters of the soft water include an electrical conductivity of equal to or less than 10 μs/cm and a pH value of 7-8.

The average particle size of the diatomite is 0.05-0.15 mm.

The molten iron is comprised of the following ingredients (the percentages are weight percentages):

C: 2.9-3.7%, Si: 1.6-2.8%, Mn: 0.2-1.0%, P: 0.05-0.4%, Cr: 0.05-0.4%, Cu: 0.3-0.5%, the balance of iron and inevitable impurities.

A plurality of protrusions 2 are provided on the outside surface of the cylinder liner 1 (see FIGS. 1-2), which is produced by the above method. The shape of the protrusions can be Ω-shaped 3, P-shaped 4 or taper-shaped 5, the amount of the Ω-shaped, the P-shaped and the taper-shaped respectively accounted for 90%, 7% and 3% of the total number of protrusions, and the density of the protrusions on the outside surface of the cylinder liner is 42 per square centimeter.

Figure 1:
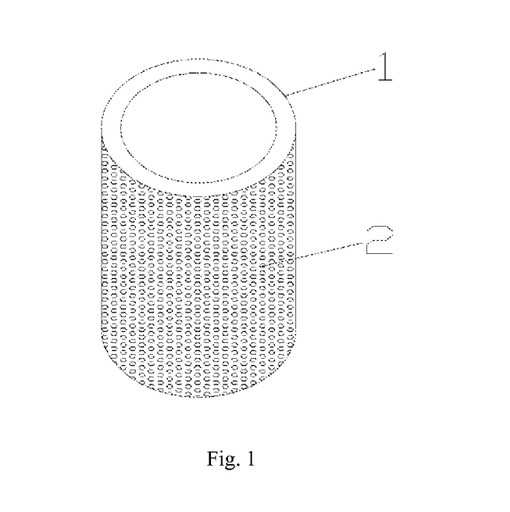
FIG. 1 shows an appearance structure diagram of a cylinder liner according to one embodiment of the present invention.
Figure 2:
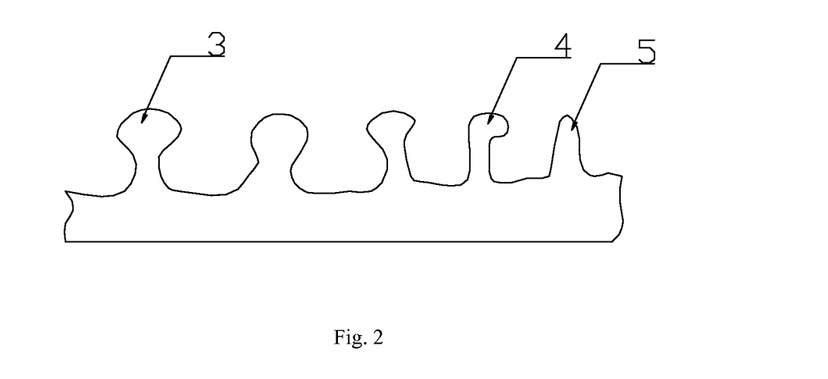
FIG. 2 shows a structure diagram of three types of shapes of protrusions 3.

The height of the protrusion is 0.75 mm. And the maximum diameter of the protrusion is 1 mm.

The ratio of the cross-sectional area of the protrusion surrounded by a contour line at a height of 0.2 mm of the protrusion to the outside surface area of the cylinder liner is 28%.

The ratio of the cross-sectional area of the protrusion surrounded by a contour line at a height of 0.4 mm of the protrusion to the outside surface area of the cylinder liner is 13%.

The cross-sectional area of the protrusion at a height of 0.4 mm of the protrusion is 0.31 mm$^2$.

A plurality of protrusions are densely distributed on the outside surface of the cylinder liner produced by the embodiment, wherein 90% of the protrusions are Ω-shaped (the high percentage of Ω-shaped protrusions can improve the performance of bite force and thermal conductivity), and 7% of the protrusions are P-shaped. Concave portions, which contract inward, configured in Ω-shaped and P-shaped protrusions can be embedded by aluminum sheaths to improve the bearing capacity of the protrusions. The thinnest portions concaved inward of Ω-shaped and P-shaped protrusions are located at a height around 0.4 mm of the protrusions. Therefore, it can effectively improve the bite force between the cylinder liner and the aluminum alloy cylinder body in aluminum alloy cylinder body.

Figure 3:
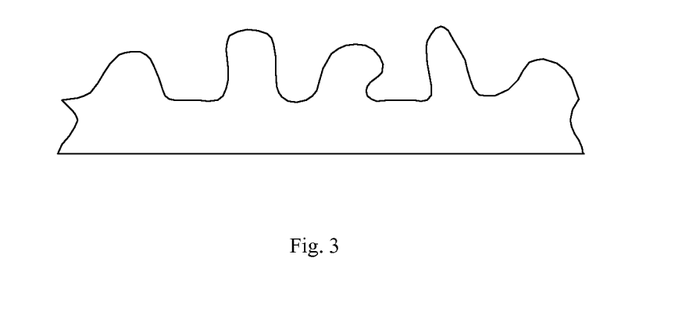
FIG. 3 shows a shape diagram of protrusions produced by hard water.

In addition to replacing soft water with hard water, others are the same as the above method to produce the cylinder liner, and the result is as follow:

FIG. 3 shows the shape of the protrusions on the outer surface of the cylinder liner produced in the method. There is no protrusion on the outer surface of the cylinder in the form of Ω-shaped, so there is no strong bite force between the cylinder liner and the outside aluminum sheath, and the outside aluminum sheath is easy to break away, which can not meet the requirement in practice.

Embodiment 2

In this embodiment, the method for manufacturing the cylinder liner includes the following steps:

(1) preparing ceramic paste with the following raw materials of respective weight percentages: 4% of adhesive (bentonite), 23% of diatomite, 0.08% of surfactant and 72.92% of soft water, wherein the ceramic paste is obtained by firstly mixing the adhesive, the diatomite and the soft water uniformly and then adding the surfactant;

(2) with controlling the temperature at 260° C. and the rotating speed of 700±50 r/min, spraying a layer of the ceramic paste with a thickness of 1.0±0.1 mm onto the inner surface of a steel mould used for manufacturing the cylinder liner, wherein the ceramic paste is immediately subject to a microburst and then forms a ceramic protective layer having a Ω-shaped cavity.

It is necessary to carefully check whether there is exceptional condition such as defect, crack, or damage in the inner cavity of the mould before pouring. Meanwhile it is necessary to ensure that, during the installation, the beating distances of the excircles at the two ends and the inner circumference of the cavity are less than 0.3 mm.

After determining there is no damage in the mould, the mould will be even heated by a flame gun, and the temperature of the excircle mould will be controlled at 260° C.

When spraying, in order to control the rotate speed of the mould at 700±50 r/min, it is necessary to detect and show that the pressure of the spraying is 3.9-4.1 kg and the speed of the spraying is 180 mm-200 mm/s.

Due to the surface tension of water reduced by the surfactant in the ceramic paste, the water in the ceramic paste can micro explode instantaneously in a given temperature, and tense Ω-shaped cavities with directivity will be formed on the surface under the impact of the centrifugal force, which will form a cavitary ceramic protective layer after drying for 60±15 s. At high temperatures, bubbles are formed from the ceramic paste first, and the Ω-shaped cavities are formed by the microburst of the bubbles.

(3) After the ceramic protective layer of the step (2) has been formed, pouring molten iron into the steel mould, and the cylinder liner being produced by filling the Ω-shaped cavity with molten iron under the impact of the centrifugal force.

It begins to pour after the uniform protective covering has been formed. At this time, molten iron at 1300-1500° C. can be poured into the mould. The process of pouring is controlled in 3-5 s, and the rotate speed of the mould is set at 1300-1500 r/min. After pouring, the rotate speed of the mould will be set at 1300-1500 r/min. Then the product is removed after condensating for 40-60 s. Finally, the cylinder liner will be abrasive blast cleaned to remove the residual paint and burrs on the surface of the cylinder liner.

The control parameters of the soft water include an electrical conductivity of equal to or less than 10 μs/cm and a pH value of 7-8.

The average particle size of the diatomite is 0.05-0.15 mm.

The molten iron is comprised of the following ingredients (the percentages are weight percentages):

C: 2.9-3.7%, Si: 1.6-2.8%, Mn: 0.2-1.0%, P: 0.05-0.4%, Cr: 0.05-0.4%, Cu: 0.3-0.5%, the balance of iron and inevitable impurities.

A plurality of protrusions are provided on the outside surface of the cylinder liner, which is produced by the above method. The shape of the protrusions can be Ω-shaped, P-shaped or taper-shaped, the amount of the Ω-shaped, the P-shaped and the taper-shaped respectively accounted for 85%, 10% and 5% of all the protrusions, and the density of the protrusions on the outside surface of the cylinder liner is 36 per square centimeter.

The height of the protrusion is 0.75 mm. And the maximum diameter of the protrusion is 1 mm.

The ratio of the cross-sectional area of the protrusion surrounded by a contour line at a height of 0.2 mm of the protrusion to the outside surface area of the cylinder liner is 24%.

The ratio of the cross-sectional area of the protrusion surrounded by a contour line at a height of 0.4 mm of the protrusion to the outside surface area of the cylinder liner is 10%.

The cross-sectional area of the protrusion at a height of 0.4 mm of the protrusion is 0.3 mm$^2$.

A plurality of protrusions are densely distributed on the outside surface of the cylinder liner produced by the embodiment, wherein 85% of the protrusions are Ω-shaped (the high percentage of Ω-shaped protrusions can improve the performance of bite force and thermal conductivity), and 10% of the protrusions are P-shaped. Concave portions, which contract inward, configured in Ω-shaped and P-shaped protrusions can be embedded by aluminum sheaths to improve the bearing capacity of the protrusions. The thinnest portions concaved inward of Ω-shaped and P-shaped protrusions are located at a height around 0.4 mm of the protrusions. Therefore, it can effectively improve the bite force between the cylinder liner and the aluminum alloy cylinder body in aluminum alloy cylinder body.

Embodiment 3

In the present embodiment, the method for manufacturing the cylinder liner includes the following steps:

(1) preparing ceramic paste with the following raw materials of respective weight percentages: 8% of adhesive (bentonite), 16% of diatomite, 0.08% of surfactant and 75.92% of soft water, wherein the ceramic paste is obtained by firstly mixing the adhesive, the diatomite and the soft water uniformly and then adding the surfactant;

(2) with controlling the temperature at 240° C. and the rotating speed of 700±50 r/min, spraying a layer of the ceramic paste with a thickness of 1.0±0.1 mm onto the inner surface of a steel mould used for manufacturing the cylinder liner, wherein the ceramic paste is immediately subject to a microburst and then forms a ceramic protective layer having a Ω-shaped cavity.

It is necessary to carefully check whether there is exceptional condition such as defect, crack, or damage in the inner cavity of the mould before pouring. Meanwhile it is necessary to ensure that, during the installation, the beating distances of the excircles at the two ends and the inner circumference of the cavity are less than 0.3 mm.

After determining there is no damage in the mould, the mould will be even heated by a flame gun, and the temperature of the excircle mould will be controlled at 240° C.

When spraying, in order to control the rotate speed of the mould at 700±50 r/min, it is necessary to detect and show that the pressure of the spraying is 3.9-4.1 kg and the speed of the spraying is 180 mm-200 mm/s.

Due to the surface tension of water reduced by the surfactant in the ceramic paste, the water in the ceramic paste can micro explode instantaneously in a given temperature, and tense Ω-shaped cavities with directivity will be formed on the surface under the impact of the centrifugal force, which will form a cavitary ceramic protective layer after drying for 60±15 s. At high temperatures, bubbles are formed from the ceramic paste first, and the Ω-shaped cavities are formed by the microburst of the bubbles.

(3) After the ceramic protective layer of the step (2) has been formed, pouring molten iron into the steel mould, and the cylinder liner being produced by filling the Ω-shaped cavity with molten iron under the impact of the centrifugal force.

It begins to pour after the uniform protective covering has been formed. At this time, molten iron at 1300-1500° C. can be poured into the mould. The process of pouring is controlled in 3-5 s, and the rotate speed of the mould is set at 1300-1500 r/min. After pouring, the rotate speed of the mould will be set at 1300-1500 r/min. Then the product is removed after condensating for 40-60 s. Finally, the cylinder liner will be abrasive blast cleaned to remove the residual paint and burrs on the surface of the cylinder liner.

The control parameters of the soft water include an electrical conductivity of equal to or less than 10 μs/cm and a pH value of 7-8.

The average particle size of the diatomite is 0.05-0.15 mm.

The molten iron is comprised of the following ingredients (the percentages are weight percentages):

C: 2.9-3.7%, Si: 1.6-2.8%, Mn: 0.2-1.0%, P: 0.05-0.4%, Cr: 0.05-0.4%, Cu: 0.3-0.5%, the balance of iron and inevitable impurities.

A plurality of protrusions are provided on the outside surface of the cylinder liner, which is produced by the above method. The shape of the protrusions can be Ω-shaped, P-shaped or taper-shaped, the amount of the Ω-shaped, the P-shaped and the taper-shaped respectively accounted for 93%, 5% and 2% of the total number of protrusions, and the density of the protrusions on the outside surface of the cylinder liner is 46 per square centimeter.

The height of the protrusion is 0.75 mm. And the maximum diameter of the protrusion is 1 mm.

The ratio of the cross-sectional area of the protrusion surrounded by a contour line at a height of 0.2 mm of the protrusion to the outside surface area of the cylinder liner is 32%.

The ratio of the cross-sectional area of the protrusion surrounded by a contour line at a height of 0.4 mm of the protrusion to the outside surface area of the cylinder liner is 16%.

The cross-sectional area of the protrusion at a height of 0.4 mm of the protrusion is 0.35 mm$^2$.

A plurality of protrusions are densely distributed on the outside surface of the cylinder liner produced by the embodiment, wherein 93% of the protrusions are Ω-shaped (the high percentage of Ω-shaped protrusions can improve the performance of bite force and thermal conductivity), and 5% of the protrusions are P-shaped. Concave portions, which contract inward, configured in Ω-shaped and P-shaped protrusions can be embedded by aluminum sheaths to improve the bearing capacity of the protrusions. The thinnest portions concaved inward of Ω-shaped and P-shaped protrusions are located at a height around 0.4 mm of the protrusions. Therefore, it can effectively improve the bite force between the cylinder liner and the aluminum alloy cylinder body in aluminum alloy cylinder body.

Embodiment 4

In the present embodiment, the method for manufacturing the cylinder liner comprises the following steps:

(1) preparing ceramic paste with the following raw materials of respective weight percentages: 4% of adhesive (bentonite), 16% of diatomite, 0.001% of surfactant and 79.999% of soft water, wherein the ceramic paste is obtained by firstly mixing the adhesive, the diatomite and the soft water uniformly and then adding the surfactant;

(2) with controlling the temperature at 260° C. and the rotating speed of 700±50 r/min, spraying a layer of the ceramic paste with a thickness of 1.0±0.1 mm onto the inner surface of a steel mould used for manufacturing the cylinder liner, wherein the ceramic paste is immediately subject to a microburst and then forms a ceramic protective layer having a Ω-shaped cavity.

It is necessary to carefully check whether there is exceptional condition such as defect, crack, or damage in the inner cavity of the mould before pouring. Meanwhile it is necessary to ensure that, during the installation, the beating distances of the excircles at the two ends and the inner circumference of the cavity are less than 0.3 mm.

After determining there is no damage in the mould, the mould will be even heated by a flame gun, and the temperature of the excircle mould will be controlled at 260° C.

When spraying, in order to control the rotate speed of the mould at 700±50 r/min, it is necessary to detect and show that the pressure of the spraying is 3.9-4.1 kg and the speed of the spraying is 180 mm-200 mm/s.

Due to the surface tension of water reduced by the surfactant in the ceramic paste, the water in the ceramic paste can micro explode instantaneously in a given temperature, and tense Ω-shaped cavities with directivity will be formed on the surface under the impact of the centrifugal force, which will form a cavitary ceramic protective layer after drying for 60±15 s. At high temperatures, bubbles are formed from the ceramic paste first, and the Ω-shaped cavities are formed by the microburst of the bubbles.

(3) After the ceramic protective layer of the step (2) has been formed, pouring molten iron into the steel mould, and the cylinder liner being produced by filling the Ω-shaped cavity with molten iron under the impact of the centrifugal force.

The pouring is started after the uniform protective covering has been formed. At this time, molten iron at 1300-1500° C. can be poured into the mould. The process of pouring is controlled in 3-5 s, and the rotate speed of the mould is set at 1300-1500 r/min. After pouring, the rotate speed of the mould will be set at 1300-1500 r/min. Then the product is removed after condensating for 40-60 s. Finally, the cylinder liner will be abrasive blast cleaned to remove the residual paint and burrs on the surface of the cylinder liner.

The control parameters of the soft water include an electrical conductivity of equal to or less than 10 μs/cm and a pH value of 7-8.

The average particle size of the diatomite is 0.05-0.15 mm.

The molten iron is comprised of the following ingredients (the percentages are weight percentages):

C: 2.9-3.7%, Si: 1.6-2.8%, Mn: 0.2-1.0%, P: 0.05-0.4%, Cr: 0.05-0.4%, Cu: 0.3-0.5%, the balance of iron and inevitable impurities.

A plurality of protrusions are provided on the outside surface of the cylinder liner, which is produced by the above method. The shape of the protrusions can be Ω-shaped, P-shaped or taper-shaped, the amount of the Ω-shaped, the P-shaped and the taper-shaped respectively accounted for 56%, 26% and 18% of all the protrusions, and the density of the protrusions on the outside surface of the cylinder liner is 30 per square centimeter.

The height of the protrusion is 0.9 mm. And the maximum diameter of the protrusion is 2 mm.

The ratio of the cross-sectional area of the protrusion surrounded by a contour line at a height of 0.2 mm of the protrusion to the outside surface area of the cylinder liner is 30%.

The ratio of the cross-sectional area of the protrusion surrounded by a contour line at a height of 0.4 mm of the protrusion to the outside surface area of the cylinder liner is 15%.

The cross-sectional area of the protrusion at a height of 0.4 mm of the protrusion is 0.5 mm$^2$.

A plurality of protrusions are densely distributed on the outside surface of the cylinder liner produced by the embodiment, wherein 56% of the protrusions are Ω-shaped (the high percentage of Ω-shaped protrusions can improve the performance of bite force and thermal conductivity), and 26% of the protrusions are P-shaped. Concave portions, which contract inward, configured in Ω-shaped and P-shaped protrusions can be embedded by aluminum sheaths to improve the bearing capacity of the protrusions. The thinnest portions concaved inward of Ω-shaped and P-shaped protrusions are located at a height around 0.4 mm of the protrusions. Therefore, it can effectively improve the bite force between the cylinder liner and the aluminum alloy cylinder body in aluminum alloy cylinder body.

Embodiment 5

In the present embodiment, the method for manufacturing the cylinder liner includes the following steps:

(1) preparing ceramic paste with the following raw materials of respective weight percentages: 8% of adhesive (bentonite), 18% of diatomite, 0.08% of surfactant and 73.92% of soft water, wherein the ceramic paste is obtained by firstly mixing the adhesive, the diatomite and the soft water uniformly and then adding the surfactant;

(2) with controlling the temperature at 240° C. and the rotating speed of 700±50 r/min, spraying a layer of the ceramic paste with a thickness of 1.0±0.1 mm onto the inner surface of a steel mould used for manufacturing the cylinder liner, wherein the ceramic paste is immediately subject to a microburst and then forms a ceramic protective layer having a Ω-shaped cavity.

It is necessary to carefully check whether there is exceptional condition such as defect, crack, or damage in the inner cavity of the mould before pouring. Meanwhile it is necessary to ensure that, during the installation, the beating distances of the excircles at the two ends and the inner circumference of the cavity are less than 0.3 mm.

After determining there is no damage in the mould, the mould will be even heated by a flame gun, and the temperature of the excircle mould will be controlled at 240° C.

When spraying, in order to control the rotate speed of the mould at 700±50 r/min, it is necessary to detect and show that the pressure of the spraying is 3.9-4.1 kg and the speed of the spraying is 180 mm-200 mm/s.

Due to the surface tension of water reduced by the surfactant in the ceramic paste, the water in the ceramic paste can micro explode instantaneously in a given temperature, and tense Ω-shaped cavities with directivity will be formed on the surface under the impact of the centrifugal force, which will form a cavitary ceramic protective layer after drying for 60±15 s. At high temperatures, bubbles are formed from the ceramic paste first, and the Ω-shaped cavities are formed by the microburst of the bubbles.

(3) After the ceramic protective layer of the step (2) has been formed, pouring molten iron into the steel mould, and the cylinder liner is produced by filling the Ω-shaped cavity with molten iron under the impact of the centrifugal force.

It begins to pour after the uniform protective covering has been formed. At this time, molten iron at 1300-1500° C. can be poured into the mould. The process of pouring is controlled in 3-5 s, and the rotate speed of the mould is set at 1300-1500 r/min. After pouring, the rotate speed of the mould will be set at 1300-1500 r/min. Then the product is removed after condensating for 40-60 s. Finally, the cylinder liner will be abrasive blast cleaned to remove the residual paint and burrs on the surface of the cylinder liner.

The control parameters of the soft water include an electrical conductivity of equal to or less than 10 μs/cm and a pH value of 7-8.

The average particle size of the diatomite is 0.05-0.15 mm.

The molten iron is comprised of the following ingredients (the percentages are weight percentages):

C: 2.9-3.7%, Si: 1.6-2.8%, Mn: 0.2-1.0%, P: 0.05-0.4%, Cr: 0.05-0.4%, Cu: 0.3-0.5%, the balance of iron and inevitable impurities.

A plurality of protrusions are provided on the outside surface of the cylinder liner, which is produced by the above method. The shape of the protrusions can be Ω-shaped or P-shaped, the amount of the Ω-shaped and the P-shaped respectively accounted for 98% and 2% of the total number of protrusions, and the density of the protrusions on the outside surface of the cylinder liner is 45 per square centimeter.

The height of the protrusion is 0.75 mm. And the maximum diameter of the protrusion is 1 mm.

The ratio of the cross-sectional area of the protrusion surrounded by a contour line at a height of 0.2 mm of the protrusion to the outside surface area of the cylinder liner is 35%.

The ratio of the cross-sectional area of the protrusion surrounded by a contour line at a height of 0.4 mm of the protrusion to the outside surface area of the cylinder liner is 15%.

The cross-sectional area of the protrusion at a height of 0.4 mm of the protrusion is 0.35 mm$^2$.

A plurality of protrusions are densely distributed on the outside surface of the cylinder liner produced by the embodiment, wherein 98% of the protrusions are Ω-shaped (the high percentage of Ω-shaped protrusions can improve the performance of bite force and thermal conductivity), and 2% of the protrusions are P-shaped. Concave portions, which contract inward, configured in Ω-shaped and P-shaped protrusions can be embedded by aluminum sheaths to improve the bearing capacity of the protrusions. The thinnest portions concaved inward of Ω-shaped and P-shaped protrusions are located at a height around 0.4 mm of the protrusions. Therefore, it can effectively improve the bite force between the cylinder liner and the aluminum alloy cylinder body in aluminum alloy cylinder body.

The above embodiments described specific and detailed are only several embodiments of the present invention, and they should not be understood as a limitation on the scope of the present invention. It should be noted that the modifications and variations will be made by the skilled in the art, which will be within the spirit of the present invention and the scope of the claims.

What is claimed is:

1. A cylinder liner, comprising a plurality of protrusions on its outside surface, wherein the protrusions are Ω-shaped, P-shaped or taper-shaped, and the Ω-shaped, P-shaped and taper-shaped protrusions are accounted for 50-99.5%, 0.5-30% and 0-20% of the total number of protrusions, respectively; wherein the density of the protrusions on the outside surface of the cylinder liner is 15-65 per square centimeter.

2. The cylinder liner according to claim 1, wherein the Ω-shaped, P-shaped and taper-shaped protrusions are accounted for 80-99.5%, 0.5-10% and 0-10% of the total number of protrusions respectively.

3. The cylinder liner according to claim 1, wherein the density of the protrusions on the outside surface of the cylinder liner is 35-45 per square centimeter.

4. The cylinder liner according to claim 1, wherein the protrusions have the height of 0.3-1.1 mm and the maximum diameter of 0.3-2.5 mm.

5. The cylinder liner according to claim 4, wherein the protrusions have the height of 0.7±0.2 mm.

6. The cylinder liner according to claim 1, wherein the ratio of the cross-sectional area of the protrusion surrounded by a contour line at a height of 0.2 mm of the protrusion to the outside surface area of the cylinder liner is 15-50%.

7. The cylinder liner according to claim 6, wherein the ratio of the cross-sectional area of the protrusion surrounded by a contour line at a height of 0.2 mm of the protrusion to the outside surface area of the cylinder liner is 20-35%.

8. The cylinder liner according to claim 1, wherein the ratio of the cross-sectional area of the protrusion surrounded by a contour line at a height of 0.4 mm of the protrusion to the outside surface area of the cylinder liner is 5-35%.

9. The cylinder liner according to claim 8, wherein the ratio of the cross-sectional area of the protrusion surrounded by a contour line at a height of 0.4 mm of the protrusion to the outside surface area of the cylinder liner is 6-16%.

10. The cylinder liner according to claim 1, wherein for each protrusion, the cross-sectional area thereof at a height of 0.4 mm of the protrusion is 0.07-5.0 $mm^2$.

11. The cylinder liner according to claim 10, wherein the cross-sectional area of each protrusion at a height of 0.4 mm of the protrusion is 0.2-0.5 $mm^2$.

12. A method for manufacturing a cylinder liner according to claim 1, comprising the following steps:

(1) preparing ceramic paste with the following raw materials of respective weight percentages: 4-8% of adhesive, 15-25% of diatomite, 0.001-0.1% of surfactant and 70-80% of soft water, wherein the ceramic paste is obtained by firstly mixing the adhesive, the diatomite and the soft water uniformly and then adding the surfactant;

(2) with controlling the temperature at 220-320° C. and the rotating speed of 700±50 r/min, spraying a layer of the ceramic paste with a thickness of 1.0±0.1 mm onto the inner surface of a steel mould used for manufacturing the cylinder liner, wherein the ceramic paste is immediately subject to a microburst and then forms a ceramic protective layer having a Ω-shaped cavity; and (3) after the formation of the ceramic protective layer of step (2), pouring molten iron into the steel mould, and producing the cylinder liner by filling the Ω-shaped cavity with the molten iron under a centrifugal force.

13. The method of claim 12, wherein the ceramic paste is made from the following raw materials with the respective weight percentages: 4-8% of the adhesive, 15-25% of the diatomite, 0.005-0.01% of the surfactant and 70-80% of the soft water.

14. The method of claim 12, wherein in the step (2) the temperature is controlled in a range of 230-260° C.

15. The method of claim 12, wherein the control parameters of the soft water include an electrical conductivity of equal to or less than 10 μs/cm and a pH value of 7-8.

16. The method of claim 12, wherein the average particle size of the diatomite is 0.05-0.15 mm.

* * * * *